(12) United States Patent
Roulston

(10) Patent No.: US 12,241,966 B2
(45) Date of Patent: Mar. 4, 2025

(54) DIPOLE ANTENNA FOR USE IN RADAR APPLICATIONS

(71) Applicant: RodRadar Ltd., Rinatya (IL)

(72) Inventor: John Francis Roulston, Edinburgh (GB)

(73) Assignee: RodRadar Ltd., Rinatya (IL)

( * ) Notice: Subject to any disclaimer, the term of this patent is extended or adjusted under 35 U.S.C. 154(b) by 121 days.

(21) Appl. No.: 18/054,995

(22) Filed: Nov. 14, 2022

(65) Prior Publication Data

US 2023/0070351 A1 Mar. 9, 2023

Related U.S. Application Data

(63) Continuation-in-part of application No. 17/259,170, filed as application No. PCT/EP2019/069412 on Jul. 18, 2019, now Pat. No. 11,502,416.

(51) Int. Cl.
| | |
|---|---|
| *H01Q 9/16* | (2006.01) |
| *G01S 13/88* | (2006.01) |
| *H01Q 1/32* | (2006.01) |
| *H01Q 1/52* | (2006.01) |

(52) U.S. Cl.
CPC ........... *G01S 13/885* (2013.01); *H01Q 1/325* (2013.01); *H01Q 1/52* (2013.01); *H01Q 9/16* (2013.01)

(58) Field of Classification Search
CPC ........ H01Q 1/32; H01Q 1/325; H01Q 1/3233; H01Q 1/3291; H01Q 1/52; H01Q 9/16; H01Q 9/28; H01Q 17/002; H01Q 21/28
See application file for complete search history.

(56) References Cited

U.S. PATENT DOCUMENTS

| 4,006,481 A | 2/1977 | Young |
|---|---|---|
| 6,351,246 B1 * | 2/2002 | McCorkle .............. H01Q 9/285 |
| | | 343/810 |
| 7,170,440 B1 | 1/2007 | Beckner |
| 8,884,834 B1 | 11/2014 | Paschen |
| (Continued) | | |

FOREIGN PATENT DOCUMENTS

| AU | 2013200058 A1 | 7/2013 | |
|---|---|---|---|
| AU | 2013200058 B2 * | 9/2016 | .............. H01Q 9/065 |
| (Continued) | | | |

OTHER PUBLICATIONS

UK Search Report for corresponding UK application 1811745.7 mailed on Jan. 10, 2019.

(Continued)

*Primary Examiner* — Hoang V Nguyen
(74) *Attorney, Agent, or Firm* — HEIDI BRUN ASSOCIATES LTD.

(57) ABSTRACT

An antenna for a ground-penetration radar system is disclosed. The antenna has a housing that defines a cavity. A radiator is located on a surface of a planar substrate within the cavity and is connected to a transmission line balun formed on the planar substrate. A wear-block is located between the radiator and the opening to the cavity for providing mechanical protection to the radiator. An absorber assembly is located on an opposite side of the radiator from the opening. The absorber assembly comprises a microwave absorber and a first dielectric layer. The first dielectric layer is located between the radiator and the microwave absorber.

8 Claims, 14 Drawing Sheets

(56) References Cited

U.S. PATENT DOCUMENTS

| | | |
|---|---|---|
| 11,502,416 B2 | 10/2022 | Conway |
| 2014/0002317 A1 | 1/2014 | Wunsch |
| 2014/0285375 A1 | 9/2014 | Crain |
| 2015/0042502 A1 | 2/2015 | Gorriti-Gonzalez |
| 2016/0218423 A1 | 7/2016 | Roulston |
| 2018/0127952 A1* | 5/2018 | Magliulo ............ G01S 13/885 |

FOREIGN PATENT DOCUMENTS

| | | | |
|---|---|---|---|
| JP | 2007006465 A * | 1/2007 | ........... H01Q 1/2225 |
| KR | 20130042364 A | 4/2013 | |

OTHER PUBLICATIONS

International Search Report for corresponding PCT application PCT/EP2019/069412 mailed on Oct. 16, 2019.
English Abstract of JP 2007006465 downloaded from Google Patents on Jan. 28, 2020.
Article by Woong Kang and Kanwook Kim, "Design and Fabrication of Resistively Loaded Dipoles using Planar Resistor Technology", 2018 International Symposium on Antennas and Propagation (ISAP), Oct. 2018.
English Abstract of KR 20130042364 downloaded from Google Patents on Feb. 20, 2023.

* cited by examiner

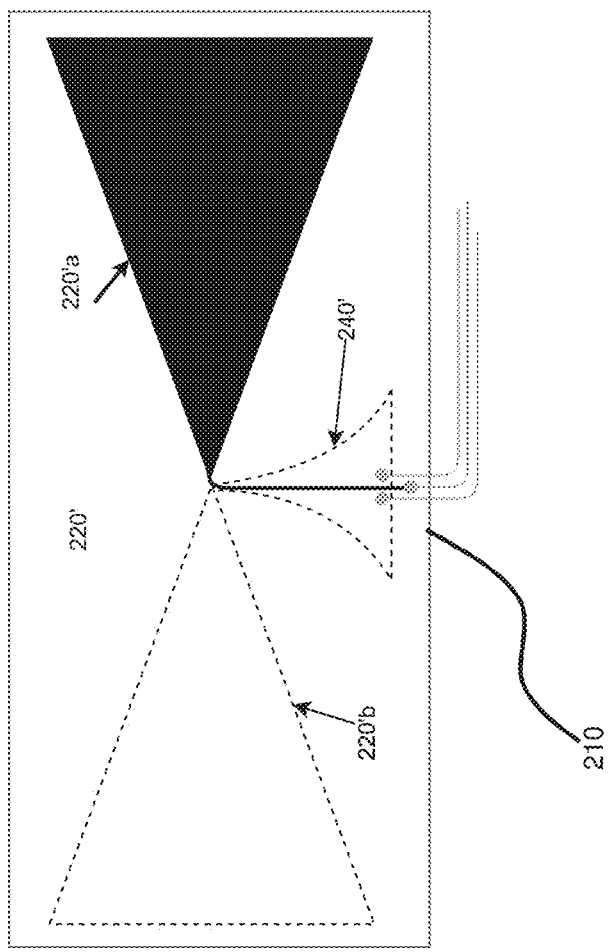

DIPOLE ANTENNA FOR USE IN RADAR APPLICATIONS

CROSS REFERENCE TO RELATED APPLICATIONS

This application is a continuation-in-part application of U.S. patent application Ser. No. 17/259,170, filed Jan. 10, 2021, which is a national phase application of International Patent Application No. PCT/EP2019/069412, filed Jul. 18, 2019, which claims priority from UK patent application 1811745.7, filed Jul. 18, 2018, all of which are incorporated herein by reference.

TECHNICAL FIELD

The disclosure relates to the field of radar systems, particularly for compact, close-range applications. One application would be ground-penetration radar in the context of a machine work tool such as an excavator bucket.

BACKGROUND

Radar systems that detect the presence of objects in an environment are well known, including ground-penetration radar systems.

In most radar applications, the antenna needs either to facilitate air coupling (such as if the antenna is mounted on a drone intended to fly some distance above the ground) or to facilitate ground coupling (such as if the antenna is mounted to the underside of a ground travelling radar survey vehicle).

However, in some cases, such as where the antenna is to be mounted on a machine work tool like an excavator bucket, the antenna needs to facilitate both air and ground coupling. This is because, to use the example of the excavator bucket, it will on some occasions be in direct contact with or very close to the ground while on other occasions it will be centimetres, tens of centimetres or even meters above the ground.

Furthermore, ground-penetration radar systems need broad bandwidth antennas, often referred to as ultra-wideband (UWB) antennas. Broad bandwidth antennas are often achieved by using a bi-cone dipole which facilitates frequency independence. Where a planar antenna is required, a so-called bow-tie antenna may be used. The bow-tie shape derives from truncation and projection onto a plane of an infinite bi-cone. Appropriate resistive loading is also necessary.

Where a ground-penetration radar antenna is mounted on a work tool such as an excavator bucket, a significant degree of mechanical ruggedness is necessary.

SUMMARY OF THE DISCLOSURE

Against this background there is provided an antenna for a ground-penetration radar application in accordance with claim 1.

BRIEF DESCRIPTION OF THE DRAWINGS

Embodiments of the invention are now described with reference to the accompanying drawings, in which:

FIG. 2b shows a schematic representation of a top view of the printed circuit board of FIG. 2a;

FIGS. 3a and 3b show schematic representations of a top view of the printed circuit shown in FIG. 2b plus two alternative baluns by which electrical connections are made to the radiator, where, FIG. 3a shows a printed copper land pattern for a 3D balun and FIG. 3b shows a transmission line balun printed on a double-sided printed circuit board;

DETAILED DESCRIPTION

Figure 11:
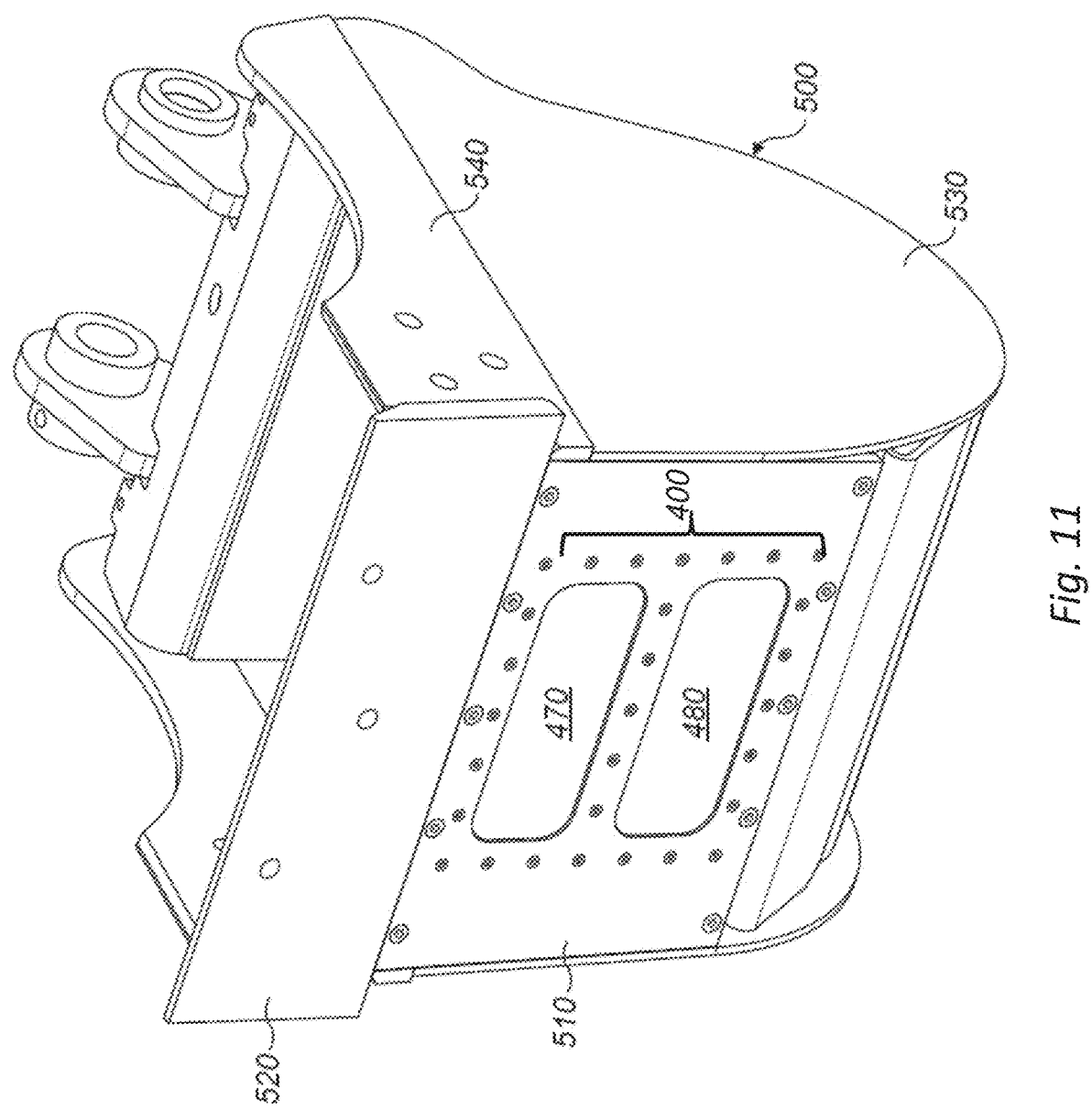
FIG. 11 shows an excavator bucket on which is mounted a dual antenna in accordance with the disclosure.

FIG. 11 shows a dual antenna assembly 400 mounted on an excavator bucket 500 for use in a ground-penetration radar application. The excavator bucket 500 may be attached to an arm of an excavator or other machine. The excavator bucket 500 may otherwise be, for example, a conventional 12 inch, 14 inch, 18 inch etc. wide excavator bucket.

The excavator bucket 500 comprises a base 510 and side surfaces 530 defining therein a cavity 540 for containing excavated material. A blade 520, which may be used for cutting into the ground, is located at a front of the base 510. The dual antenna assembly 400 is mounted to an outside surface of the base 510 of the excavator bucket 500 in the same plane as and behind the blade 520. One of the two antennas 470, 480 of the dual antenna assembly 400 may be used as a transmitter and the other of the two antennas 480, 470 may be used as a receiver.

As already explained, one of the challenges around antenna design for such an application as this is the need for the antenna to couple to the ground (when the bucket is cutting into or proximate to the ground) and for the antenna to couple to air (when the bucket is elevated). Another of the challenges is that the antenna must be of a rugged and slim construction, given its intended located on the base 510 of the bucket and where it will inevitably experience mechanical stresses and strains given the purpose of the bucket.

Figure 1:
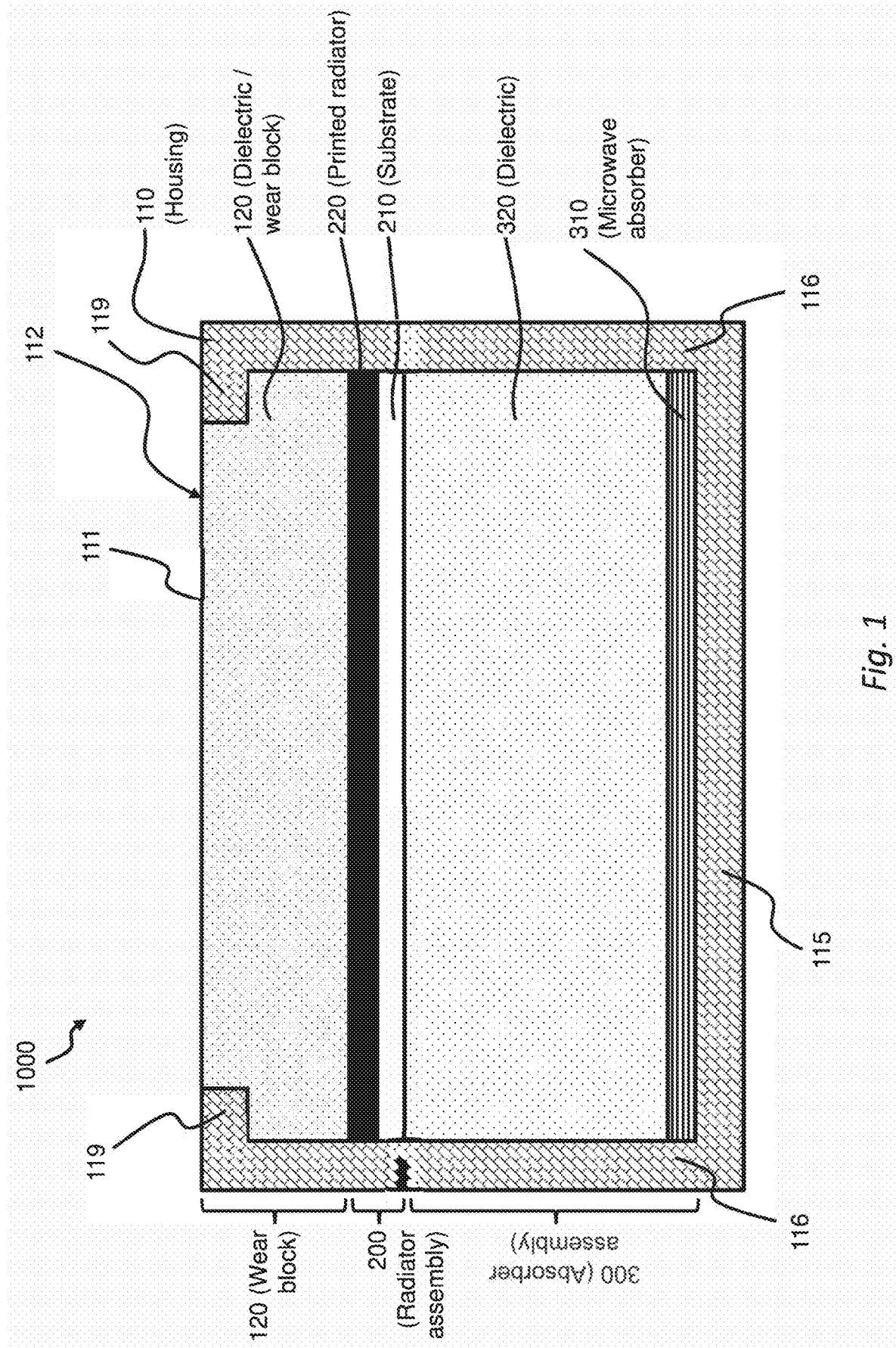
FIG. 1 shows a schematic representation of a section through an antenna in accordance with the disclosure.

FIG. 1 shows a schematic representation of a section through an antenna 1000 similar to one of the pair of antennas 470, 480 of the dual antenna assembly 400 of FIG. 11.

The antenna 1000 comprises a housing 110 defining a cavity 112 with a bottom surface 115, a plurality of side surfaces 116, and a plate 119, which may be termed a heel plate 119, opposite the bottom surface 115. The plate 119 has an opening 111 providing an opening 111 to the cavity 112. The housing 110 may be of metal, preferably of aluminium or aluminium alloy.

The cavity 112 may contain a wear-block 120, a radiator assembly 200 and an absorber assembly 300. The radiator assembly 200 is sandwiched between the wear-block 120 and the absorber assembly 300 such that the wear-block 120 is located at the opening 111 to the cavity and the absorber assembly 300 is located adjacent the bottom surface 115 of the cavity 112 and furthest from the opening 111 to the cavity 112. In this way, with the radiator assembly 200 is located in between the wear-block 120 and the absorber assembly 300.

The radiator assembly 200 may comprise a printed circuit board substrate 210 on an upper side of which is printed a metallic radiator 220 described in more detail below.

The radiator 220 may be of copper. The copper may be 1 oz. (28.3 g) copper.

In one embodiment, the radiator assembly 200 may be approximately 215 mm in length and 90 mm in width. In this embodiment, where the radiator has a typical bow-tie shape, the radiator 220 may be approximately 190 mm in length and 50 mm in width at the broadest portion of the bow-tie.

In alternative embodiments, modifications similar to those reported in the literature may be made to the bow-tie shape to improve bandwidth and match. Examples are the curvature of the perimeter of the bow-tie and slots placed at specific locations within its area. The concept is that by shaping the conducting geometry, the current paths in the antenna may be influenced which may, in turn, influence antenna performance. In these alternative embodiments, the antenna may have a bow-tie-based shape.

Located at the opening 111 of the cavity 112 and occupying the volume between the opening 111 and the top surface of the printed radiator 220 is the wear-block 120. There may be at least two purposes of the wear-block 120. In particular, the wear-block 120 may be of a material having dielectric properties selected to provide matching to both air and ground. Secondly, it may have particularly hard-wearing properties (hence the term "wear-block") whilst recognising that some mechanical damage may be inevitable when mounted on the underside of an excavator bucket 500, for example. It may therefore also be configured to sustain mechanical damage such as scratches and dents so as to protect the radiator 220 from such damage. In this way, scratches and other mechanical damage to the wear-block 120 may be prevented from affecting operation of the antenna 1000 to any significant degree.

The relative permittivity (dielectric constant) of ground surfaces which a user may wish to penetrate with the blade 520 of an excavator bucket 500 may typically be around 4.0 while that of air may be 1.0. Accordingly, selecting a wear-block 120 having a relative permittivity (dielectric constant) between these two values may be appropriate. A relative permittivity (dielectric constant) of approximately 2.7 may be most preferable as this facilitates both ground and air coupling.

The wear-block 120 may be of plastic. For example, the wear-block 120 may be of polycarbonate or polyurethane. The wear-block 120 may be of a plastic that measures 60, or more than 60, on the Shore D durometer scale. Such a wear-block has a particularly hard-wearing properties as well as appropriate permittivity. The wear-block 120 may have a thickness of approximately 20 mm.

Located adjacent the bottom surface 115 of the cavity 112 furthest from the opening 111 (beneath the radiator assembly 200 in the orientation shown in FIG. 1) is located the absorber assembly 300. The absorber assembly 300 comprises an absorber 310 at the bottom of the cavity 112 adjacent the bottom surface 115 and first dielectric layer 320 between the absorber 310 and the radiator assembly 200. The first dielectric layer 320 may be sufficiently thick such that capacitive coupling between the absorber 310 and the printed radiator 220 is negligible. The thickness of the first dielectric layer 320 may, for example, be approximately 20 mm, approximately 30 mm, approximately 40 mm, or any other suitable thickness. The absorber 310 may be between 0.5 mm and 2.0 mm in thickness and preferably 0.8 mm in thickness.

The microwave absorber may comprise metal flakes distributed in a polymer resin. Alternatively, the microwave absorber may comprise graphite.

Figure 12:
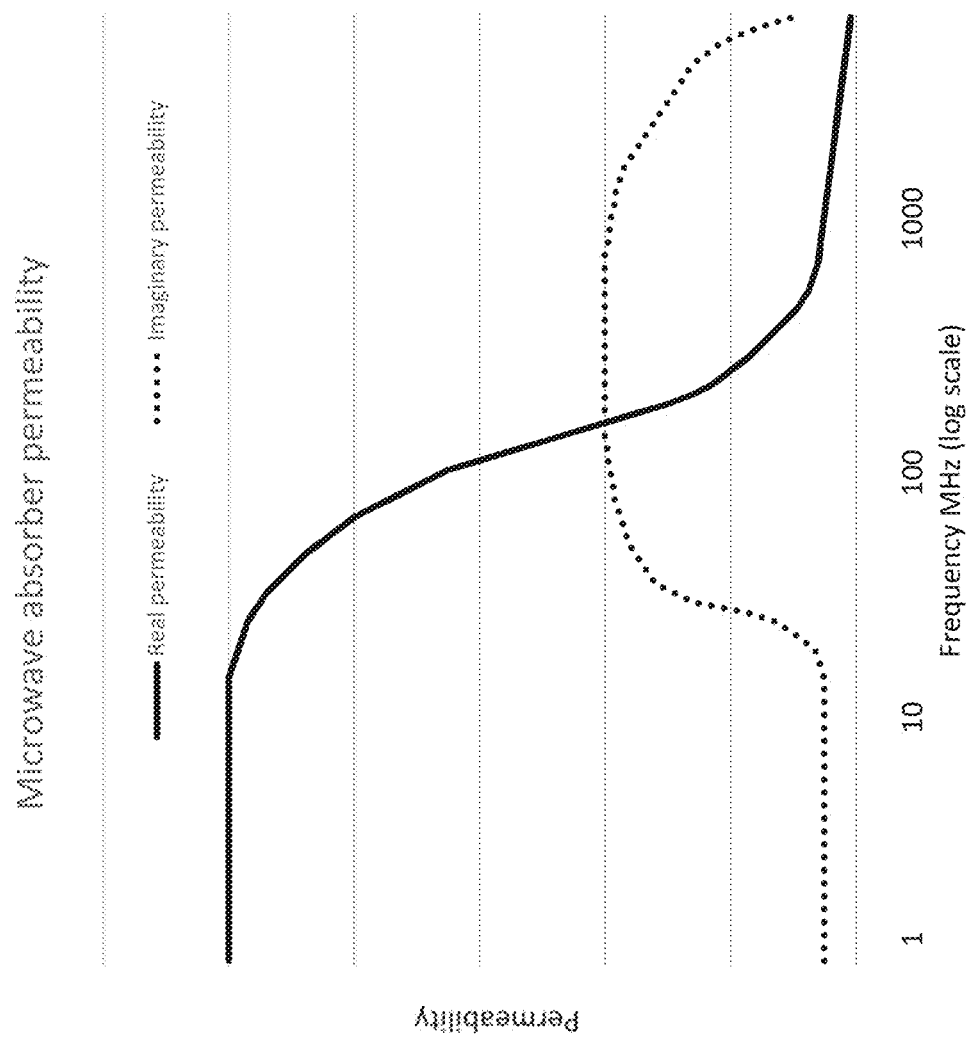
FIG. 12 shows permeability properties of a typical microwave absorber for use with the antenna assembly of the disclosure.

FIG. 12 shows typical permeability properties of the microwave absorber 310. These permeability properties result in typical power loss shown in FIG. 13.

In this way, the microwave absorber 310 absorbs back reflections of microwave radiation that reflects off the bottom surface 115 of the housing 110. Back reflections that are absorbed by the microwave absorber 310 do not therefore reach the radiator and/or a second antenna that uses its radiator as a receiver.

Figure 13:
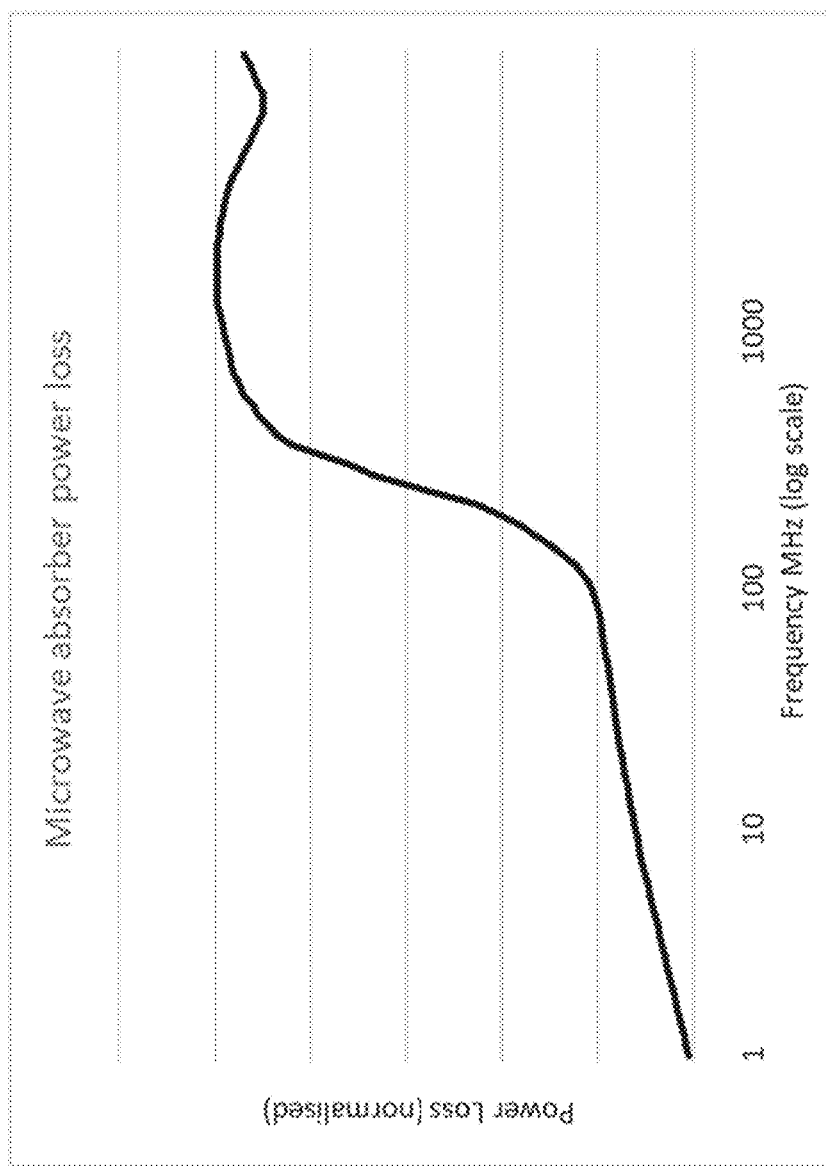
FIG. 13 shows power loss properties of the microwave absorber for use with the antenna assembly of the disclosure.

In an antenna that makes use of the frequency bank between 500 MHz and 1,300 MHz, it can be seen particularly clearly from FIG. 13 that the power loss provided by the microwave absorber 310 within this frequency band is high compared with at lower frequencies.

An appropriate value for relative permittivity (dielectric constant) of the first dielectric layer 320 may be between 1.0 and 4.0, preferably around 2.7.

The first dielectric layer 320 may be of plastic. For example, the first dielectric layer may be of polycarbonate. The first dielectric layer 320 may be of a plastic that measures 60, or more than 60, on the Shore D durometer scale. This has hard-wearing properties as well as appropriate permittivity. The requirement for a hard-wearing plastic may be less important in the case of the first dielectric layer 320 than in the case of the wear-block 120. This is because the first dielectric layer 320 is enclosed by various other features of the antenna 1000 and therefore much less susceptible to direct mechanical damage.

The housing 110 may be pre-formed prior to the installation of the various components (including the wear-block 120, the radiator assembly 200 and the absorber assembly 300) that the finished antenna assembly 1000 or 400 contains.

Alternatively, in some embodiments, the wear-block 120, the radiator assembly 200 and the absorber assembly 300 may be assembled first and the housing 110 may be formed around them. As such, the cavity 112 may be dimensioned so as to envelope the exact exterior form of the combination of the wear-block 120, the radiator assembly 200 and the absorber assembly 300. In some embodiments, it may be that the housing 110 is formed by a process of metallisation or a metal coating technique as known in the art such but not limited to vacuum metallisation, thermal spraying, or cold spraying.

By forming the housing 110 around the wear-block 120, the radiator assembly 200 and the absorber assembly 300, air gaps between the housing 110 and its contents are eliminated (or at least vastly minimised) which avoids or at least significantly reduces resonant effects (secondary resonances) that would result from such air gaps.

Alternatively, antenna 1000 may be manufactured by pouring a liquid version of the plastic, such as polyurethane resin, into a mould which holds the non-plastic elements of the antenna (i.e., at least the radiator and, in some embodiments, the housing). This operation may be performed under vacuum to overcome voids due to out-gassing.

Figure 2A:
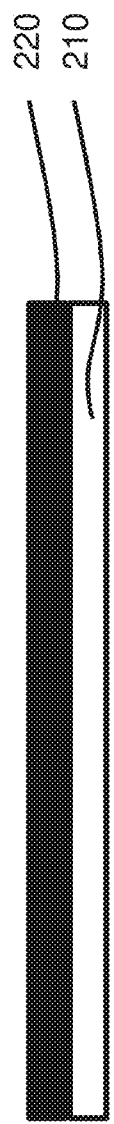
FIG. 2a shows a schematic representation of a section through a printed circuit board that is a constituent of the antenna of FIG. 1.
Figure 2B:
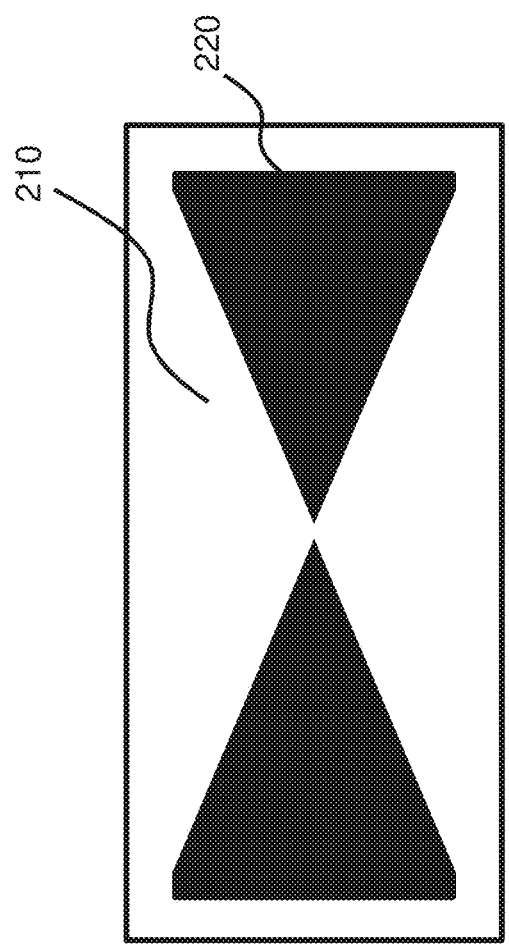

FIGS. 2a and 2b show a schematic representation of the radiator assembly 200 of the antenna 1000 of FIG. 1. The radiator assembly 200 is shown in cross section in FIG. 2a and in plan view in FIG. 2b.

The radiator assembly 200 may be manufactured from a printed circuit board comprising a substrate 210 having a metallic layer that covers the whole area of a top surface of the substrate 210. The planar bow-tie form of the radiator 220 may be produced using conventional printed circuit board techniques involving using a mask to distinguish between areas of the metallic layer to be retained and areas of the metallic layer to be removed. Removal of the unwanted areas of the metallic layer, such as by selective etching of unmasked areas, results in the bow-tie shape illustrated in FIG. 2b.

Ground-penetration radars need broadband antennas. Typically the bandwidth will be approximately equal to the centre frequency. This leads to high percentage bandwidth. In the present application, the bandwidth is achieved by shaping (e.g., angling) the arms of the radiating element.

A common approach is the bi-cone dipole which avoids resonance because an infinite cone can be defined by angle only. Since it is length independent, it is wavelength independent and therefore frequency independent. In the present context, a three-dimensional radiator is not feasible. The bow-tie shape of the radiator of the present disclosure is derived from a truncated bi-cone projected onto a plane. This shape maintains some of the frequency independent nature of the infinite dipole, whilst being realisable in a planar manner of realistic dimensions for the intended purpose.

Figure 3A:
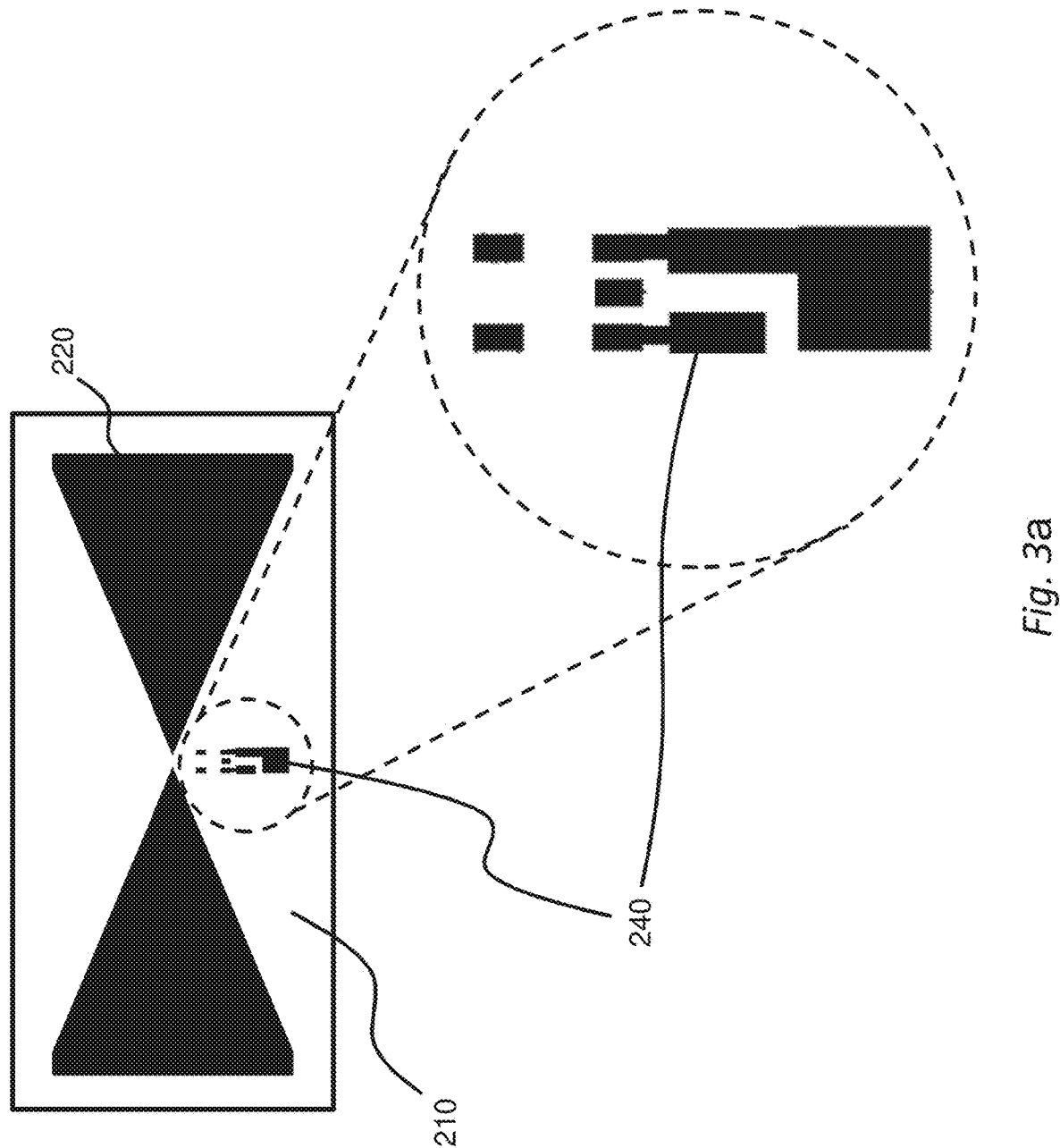

FIG. 3a shows a plan view of the bow-tie radiator 220 on its substrate 210 and also shows the attachment footprint for a conventional, miniature, Ruthroff Transformer balun 240 which provides an electrical connection to the bow-tie radiator 220.

The balun 240 is mounted on the substrate 210 so as to connect to the centre of the bow-tie of the radiator via metallic electrical connections formed by conventional means in the printed circuit board. These may be formed by etching in parallel with the process of etching the radiator geometry. The balun 240 may be mounted with its main axis in a plane parallel to the plane of the bow-tie radiator 220. The balun 240 may also be mounted with its main axis perpendicular to the main axis of the bow-tie radiator 220. In this way it may be conveniently accommodated in a triangular space on the substrate between the two halves of the bow-tie radiator 220. Furthermore, the balun 240 may have a slim form factor such that it is larger in length and width relative to its thickness by which it protrudes from the surface of the substrate 210.

The thickness of the balun 240 by which it protrudes from the surface of the substrate may be accommodated in the wear-block 120 by virtue of a recess (not shown in the figures) in the wear-block 120 whose geometry and overall volume largely corresponds to the geometry and overall volume of the balun 240. By mounting a thin form factor balun 240 largely parallel to the plane of the substrate 210 and by accommodating the balun 240 in a form-fitting recess of the wear-block 120, the balun 240 may withstand mechanical forces with which the antenna 1000 is likely to come into contact, especially when mounted to an excavator bucket 500.

Alternative mounting arrangements and orientations of the balun 240 are possible. While the balun 240 is shown in FIG. 3 as being mounted on the circuit board substrate 210 with its major axis parallel to the plane of the circuit board substrate 210, in an alternative embodiment the balun 240 may be mounted such that its major axis projects up from the plane of the circuit board substrate 210. In this way, the balun 240 may be recessed in the vertical wall of the wear-block 120. As with the first described balun position and orientation, the geometry and overall volume of the recess may largely correspond to the geometry and overall volume of the balun 240. By mounting the balun 240 in this alternative orientation, compressive loading on the balun 240 may be reduced.

One or more coaxial transmission cables (not shown) may be provided for the purpose of feeding signals to and from the balun 240. The balun 240 may be connected to the radiator 220 using either co-axial lines or printed transmission lines on a flexi circuit. There may also be provided a transformer at or in the vicinity of the balun 240 or the one or more coaxial transmission cables.

FIG. 3b shows bow tie radiator 220' with an alternative printed transmission line balun 240', printed on circuit board substrate 210. It will be appreciated that transmission line balun 240' is a two-dimensional (2D) balun, as opposed to balun 240 which is 3D. Because transmission line balun 240' is flat, it may be more robust in a tough environment. It will be appreciated that, in this embodiment, transmission line balun 240' lies in a plane parallel to the plane of the radiator. Moreover, by being printed on circuit board substrate 210, balun 240' may be generated during the process of fabricating radiator 220, and may be more flexible in the impedance transformation it can achieve.

In the embodiment of FIG. 3b, radiator 220' may have an antipodal arrangement such that one half (labelled 220'a) is printed on the topside of circuit board 210 and the other half (labelled 220'b) is printed on the underside of circuit board 210.

In some embodiments it may be that the sum of the volumes of all the components listed herein as being accommodated in the cavity 112 or any particular antenna is at least 90% of the volume of the cavity 112, such that the cavity is at least 90% occupied without air gaps. Preferably, the figure of 90% may be 95% or more preferably 98% or even more preferably 99%. In this way, seams of air within the confines of the housing 110, which might create resonant effects (secondary resonances), can be avoided or at least minimised. Furthermore, there is limited scope for movement of components relative to one another which increases the mechanical ruggedness of the overall package.

It will be appreciated that resistive loading, such as the Wu-King resistive loading described in the article by Woong Kang and Kanwook Kim, "Design and Fabrication of Resistively Loaded Dipoles using Planar Resistor Technology", 2018 International Symposium on Antennas and Propagation (ISAP), October 2018, may be included in antenna 1000.

Figure 4:
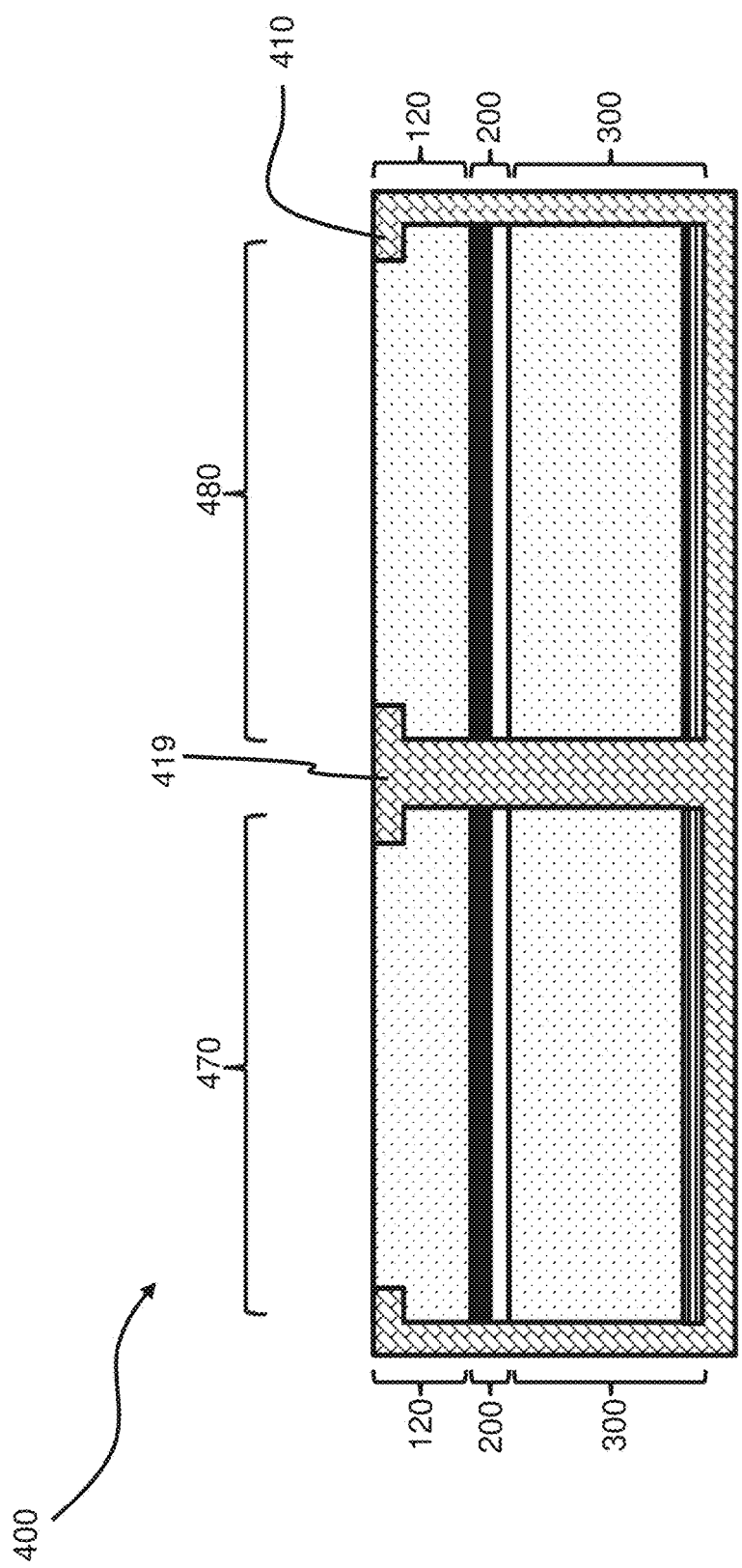
FIG. 4 shows a dual antenna comprising a pair of antennas of the FIG. 1 embodiment.
Figure 5:
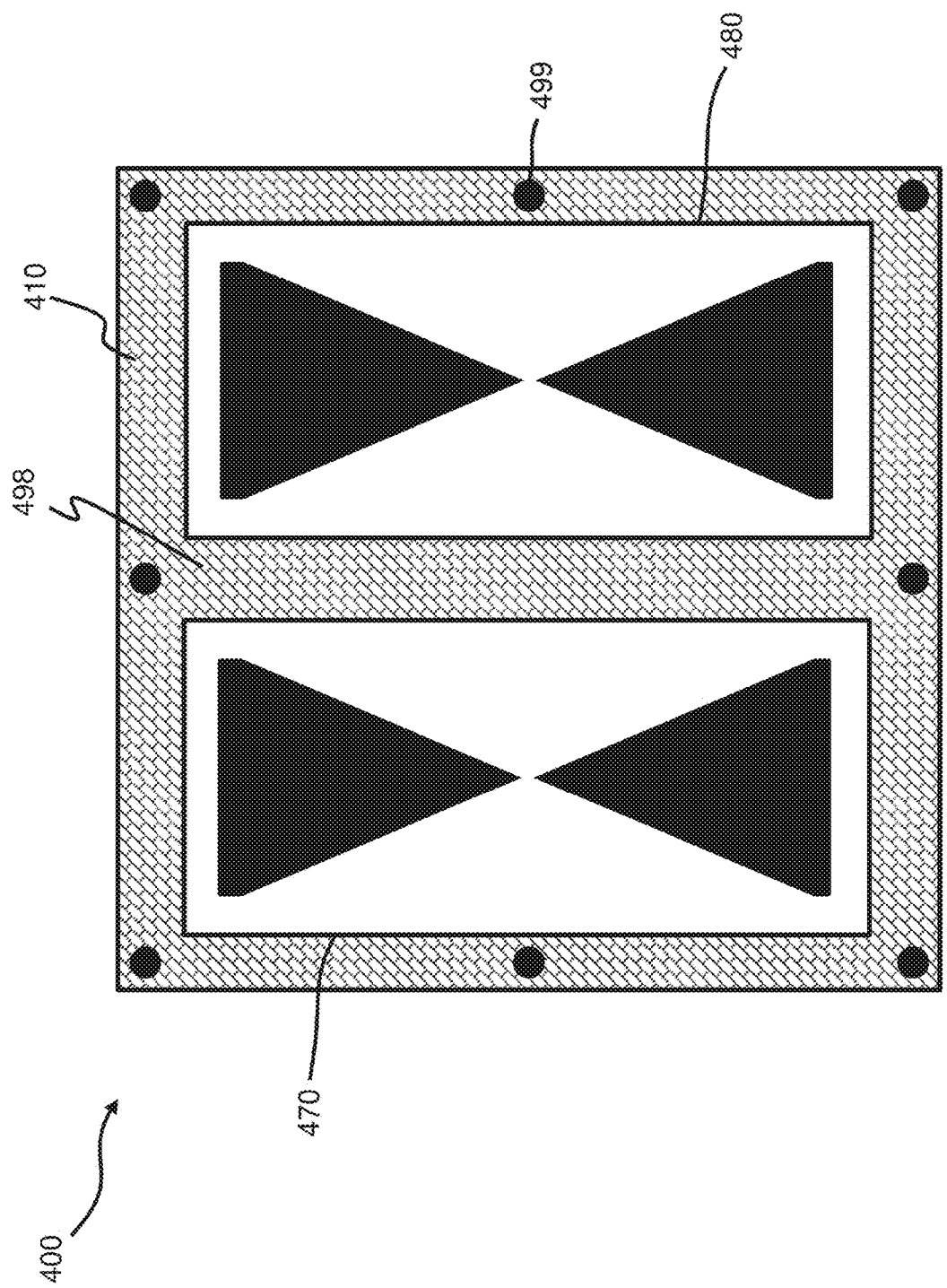
FIG. 5 shows a top view of the dual antenna of FIG. 4.

While the antenna 1000 of the present disclosure is not limited for use with ground-penetration radar applications, or indeed radar applications, in the case of such applications and others it is common to provide a pair of matched antennas 470, 480—one to transmit and one to receive. FIGS. 4 and 5 show a dual antenna assembly 400 that comprises a matching pair of antennas 470, 480 in accordance with the disclosure. As shown, a compound housing 410 is provided to accommodate a matching pair of antennas 470, 480. The housing 410 may comprise two separate but matching cavities, one for each of the pair of antennas 470, 480. Each antenna 470, 480 may otherwise be as shown in respect of the FIG. 1 embodiment, or perhaps as shown in respect of one of the alternative embodiments shown in FIGS. 6, 7, 8 and 9, and as described further below.

In the embodiment of FIGS. 4 and 5, the housing provides a central divider 498 between each of the two cavities. The central divider 498 may also provide part of the heel plate 419.

The dual antenna assembly 400 of FIGS. 4 and 5 may have a square footprint, as evident from FIG. 5. An advantage of a square footprint is that it is rotationally symmetric to allow for straightforward rotation of the dual antenna assembly 400 by 90° whilst occupying the same space (see FIG. 11). The housing 410 may be provided with fixing apertures 499 (through which bolts might be used to secure the housing 410 to, for example, an excavator bucket). The fixing apertures 499 may be selected to maintain the rotationally symmetric nature of the footprint of the dual antenna so as to allow a user to choose in which orientation to mount the dual antenna assembly 400.

As such, in a first orientation each of the pair of antennas 470, 480 is mounted to run from the blade 520 to the back of the bucket 500. In a second orientation, the dual antenna assembly is rotated by 90° relative to the first orientation, such that each of the pair of antennas 470, 480 is mounted to run from side to side relative to the bucket 500. The two different orientations may lend themselves to different uses of the bucket 500.

As the skilled person recognises, rotational symmetry may be provided by a housing having a shape other than a square. Such alternative rotationally symmetric housings fall within the scope of the present disclosure.

Figure 6:
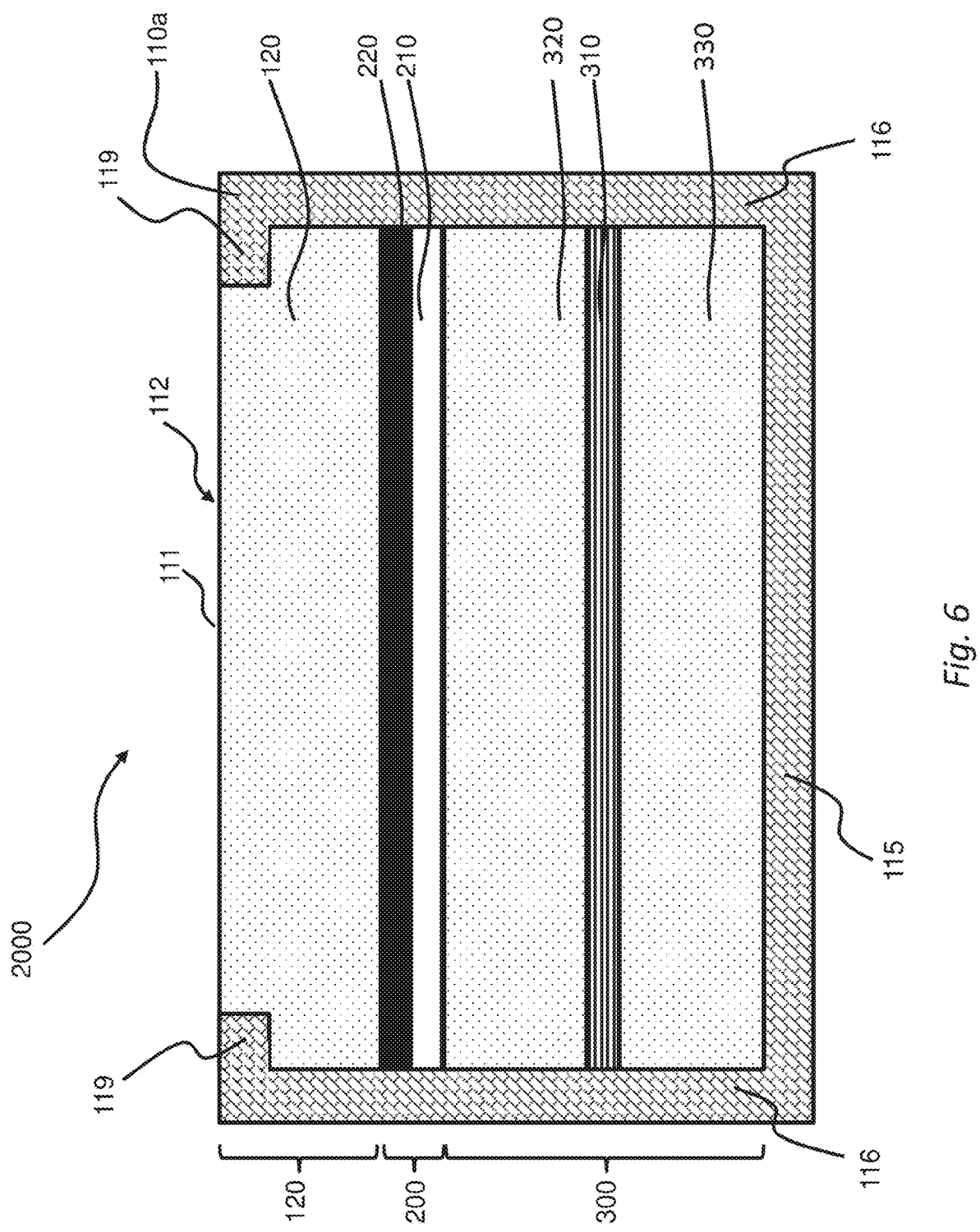
FIG. 6 shows a first alternative embodiment to that of FIG. 1.

FIG. 6 shows an antenna 2000 of an alternative embodiment to that shown in FIG. 1. FIG. 6 differs from FIG. 1 in that the absorber assembly 300 is differently configured. Instead of the microwave absorber 310 being located at the bottom of the cavity with the dielectric layer 320 being only above the microwave absorber 310, there is a pair of dielectric layers 320, 330 with the absorber 310 located therebetween. A lower dielectric 330 is placed at the bottom of the cavity 112, the absorber 310 is placed above the lower dielectric layer 330 and an upper dielectric later 320 fills the space above the absorber 310 beneath the radiator assembly 200.

Figure 7:
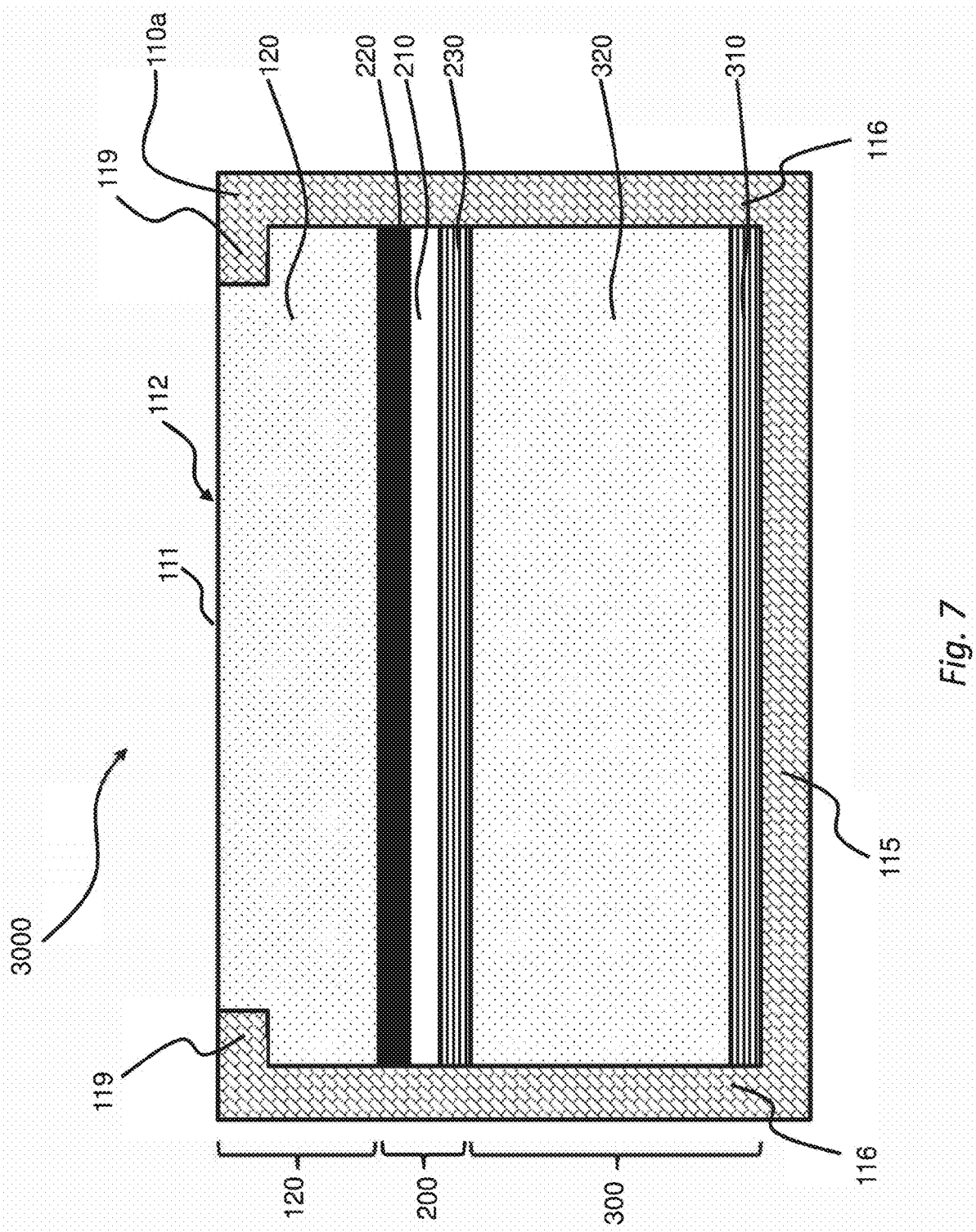
FIG. 7 shows a second alternative embodiment to that of FIG. 1.

FIG. 7 shows an antenna 3000 of a further alternative embodiment to that shown in FIG. 1. FIG. 7 differs from FIG. 1 in that the radiator assembly 200 further comprises an absorbing underlay 230 for absorbing microwave radiation located beneath the printed circuit board substrate and above the dielectric 320. The absorbing underlay 230 may be coated onto the underside of the printed circuit board substrate 210. Alternatively, the absorbing underlay 230 may be a separate component proximate the underside of the printed circuit board substrate 210. The absorbing underlay 230 may be of graphite. The absorbing underlay 230 may be capacitively coupled to the printed radiator 220 via the printed circuit board substrate 210. (This contrasts with the microwave absorber 310, which is not capacitively coupled to the printed radiator 220.) The printed circuit board substrate 210 may have a thickness of less than 0.5 mm, preferably between 0.2 mm and 0.4 mm, more preferably 0.25 mm, which enables the capacitive coupling by comparison with standard printed circuit boards that tend to have a thickness of approximately 1.6 mm.

The absorbing underlay 230 may have a resistivity of between 100 Ohms/square and 1,000 Ohms/square, more preferably between 400 Ohms/square and 600 Ohms/square. The absorbing underlay 230 may have a resistance that is constant across its area or it may vary across its area. The absorbing underlay 230 may be continuous or may be discontinuous. In the latter case it may be shaped to interact with the radiator only in specific areas.

The absorbing underlay 230 may be painted, sprayed, printed or otherwise deposited on the underside of the substrate 210. Painting, spraying or printing of the absorbing underlay 230 may be of a colloidal solution of graphite. In one alternative approach, the absorbing underlay 230 may be deposited on a temporary surface and then transferred to the underside of the substrate 210.

The mechanism of absorption of the resistive underlay may be to dissipate as heat a current that flows in the electrically resistive absorbing underlay by virtue of its capacitive coupling to the radiator.

Figure 8:
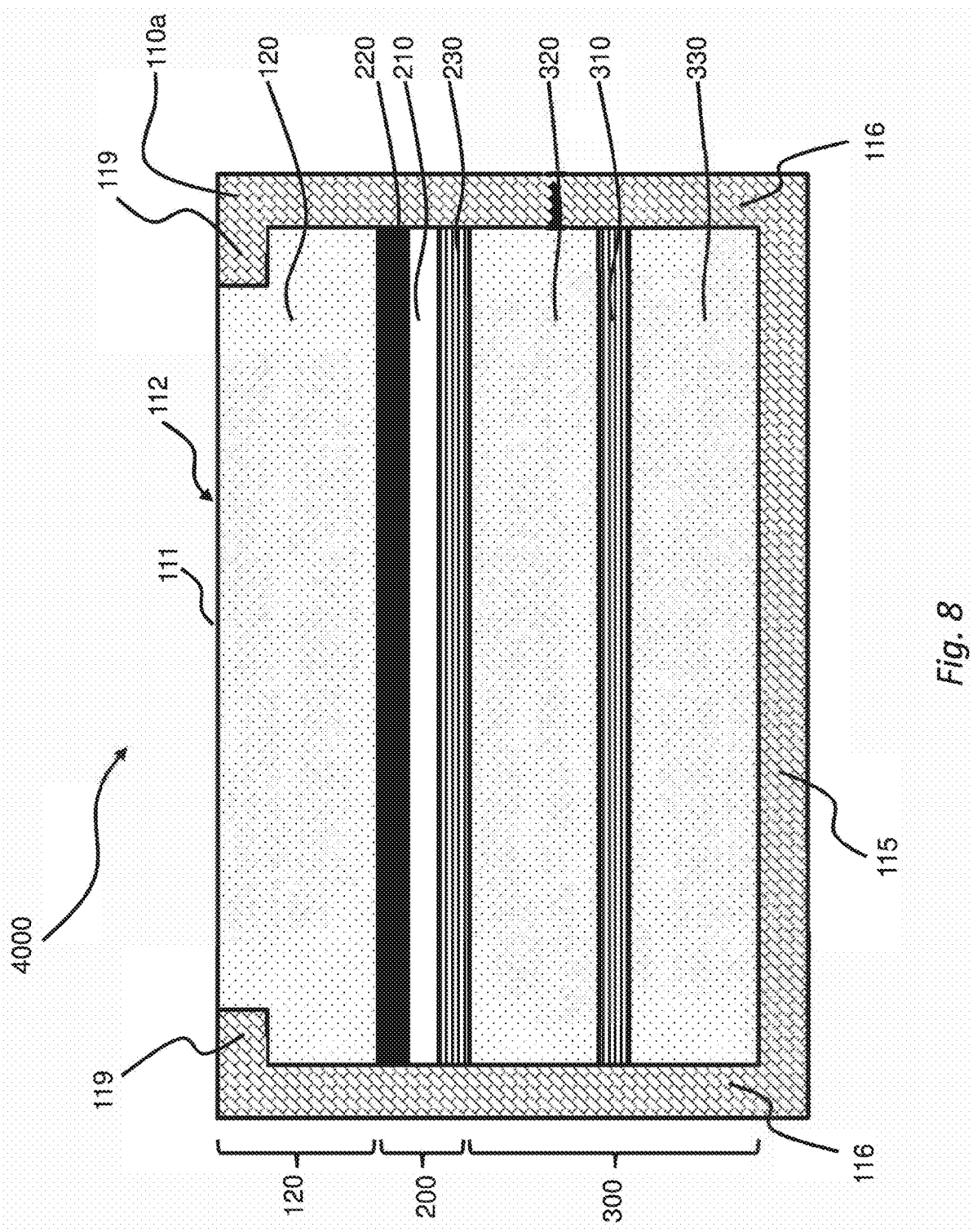
FIG. 8 shows a third alternative embodiment to that of FIG. 1.

FIG. 8 shows an antenna 4000 of a further alternative embodiment to that shown in FIG. 1. The FIG. 8 embodiment effectively includes the additional feature of the FIG. 6 embodiment in combination with the additional feature of the FIG. 7 embodiment.

Figure 9:
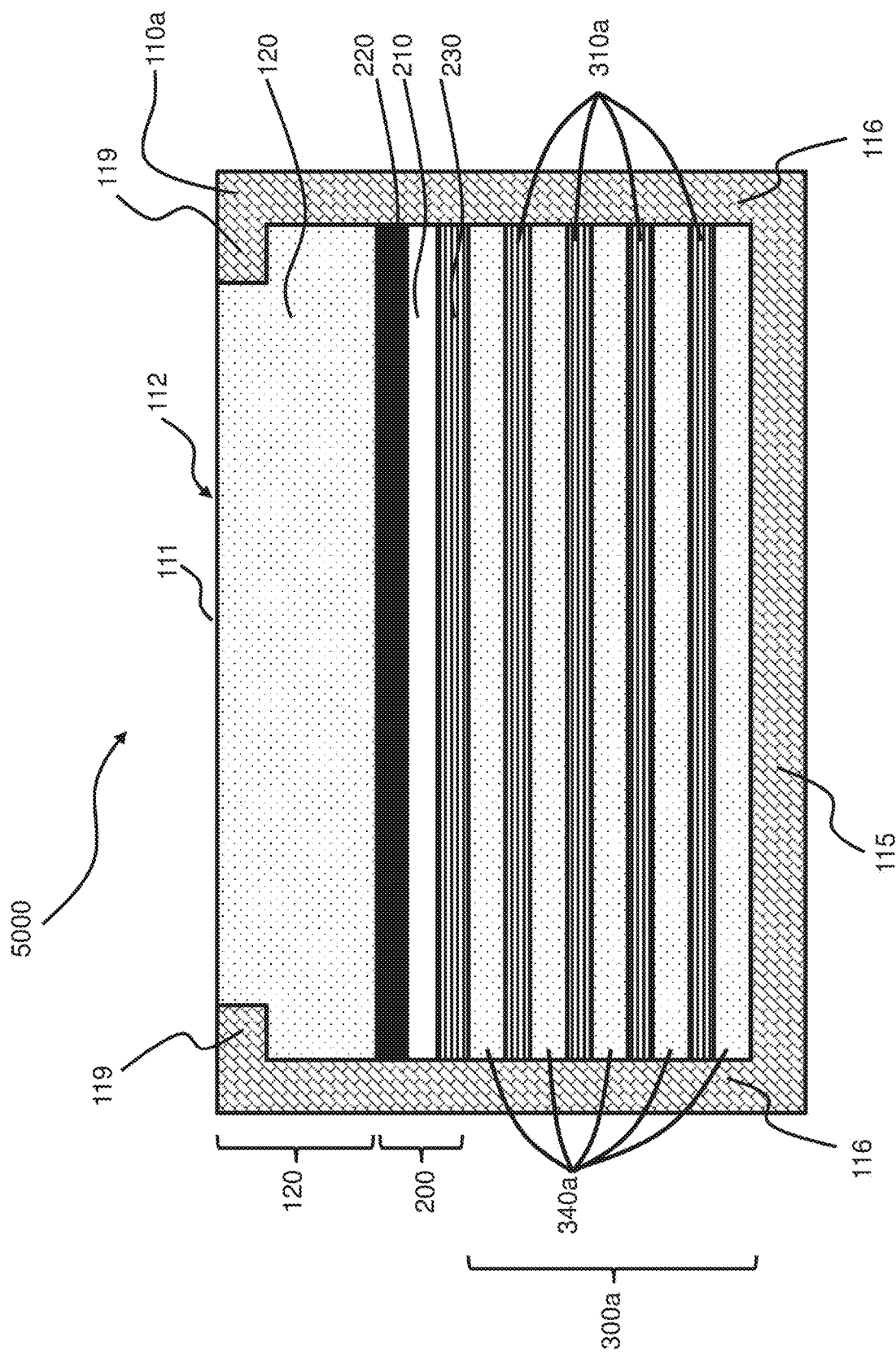
FIG. 9 shows a fourth alternative embodiment to that of FIG. 1.

FIG. 9 shows an antenna 5000 of a further alternative embodiment to that shown in FIG. 1.

In the FIG. 9 antenna 5000, the absorber assembly 300 comprises a stack of multiple dielectrics, with an absorber between each pair of adjacent dielectrics in the stack. For example, it may comprise N dielectrics and N−1 absorbers, alternating between dielectric and absorber. FIG. 9 illustrates a specific example where N=5. As such, the illustrated example of FIG. 9 includes an absorber assembly 300a that comprises five dielectric layers 340a and four absorber layers 310a.

In another example (not illustrated), the absorber assembly 300 may comprise an upper dielectric 320 and an absorber 310 and, in place of the lower dielectric 330, there may be N dielectrics and N−1 absorbers. (In other words, above dielectric 320, the absorber assembly may be of the type shown in FIG. 8 while below the dielectric 320 the absorber assembly may be more like that shown in FIG. 9.) In one particular arrangement, a 10 mm thick lower dielectric 330 may be substituted for five dielectrics 340a, each 2 mm thick, with absorber sheets 310a interposed.

Absorption properties of the antenna may also be adapted by employing discontinuous absorption or dielectric elements.

Figure 10:
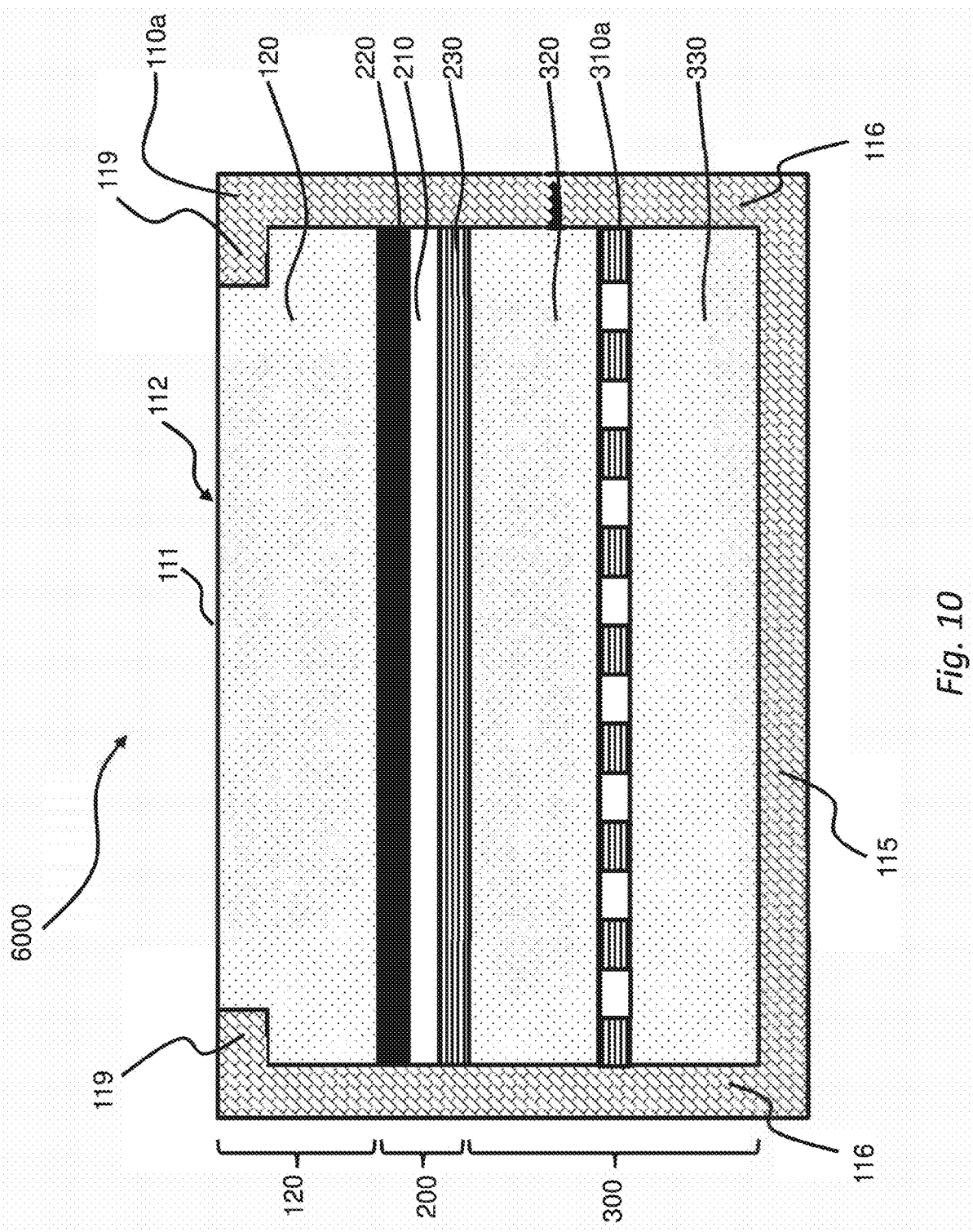
FIG. 10 shows a fifth alternative embodiment to that of FIG. 1.

FIG. 10 shows an antenna 6000 of a further alternative embodiment to that shown in FIG. 8. In place of the continuous absorber layer 310 of the FIG. 8 antenna 4000, there may be a discontinuous absorber layer 310a. (As with all of the figures of this application, the skilled person appreciates the highly schematic nature of the representation of the discontinuities in the absorber layer 310a.)

The discontinuities in microwave absorber layer 310a may—in addition to its distance from the radiator 220—further reduce the likelihood of capacitive coupling between the radiator 220 and the microwave absorber 310a.

The present disclosure encompasses the use of these different absorption features either separately or in combination. The precise combination of absorption features may be selected dependent upon the particular application.

As mentioned previously in the context of FIG. 11, one application of the antenna (in particular the dual antenna assembly 400) of the present disclosure is in the context of a radar system for a machine work tool such as an excavator bucket 500. (It should be noted that the dual antenna assembly 400 of FIG. 11 does not have the rotationally symmetric mounting feature described above.)

In addition to the antenna assembly 400, the excavator bucket 500 of the FIG. 11 embodiment may comprise a top cavity (not visible in FIG. 11), enclosed within the bucket cavity 540 at an opposing face of the bucket 500 relative to the base 510. The top cavity may comprise a removable panel attached in position by fasteners.

The excavator bucket 500 may further comprise one or more conduits (not shown in FIG. 11) within the bucket cavity 540 providing a connection between each antenna 470, 480 of the dual antenna assembly 400 and the top cavity.

The top cavity may contain a radar control module. The radar control module may comprise one or both of a digital printed circuit board and an analogue printed circuit board.

Coaxial cables (not shown) facilitate communication between each antenna 470, 480 of the dual antenna assembly 400 and the radar control module. The coaxial cables may be channelled in the conduits.

A plurality of fasteners may be employed to fasten the dual antenna assembly 400 to the base 510 of the excavator bucket 500. The fasteners may be mounted such that they do not protrude beneath the surface of the base 510. In this way they are less vulnerable to damage. By contrast, the fasteners may be mounted such that they do protrude above an inner surface of the bucket cavity 540. This is to enable the fasteners to be ground away (for example with an angle grinder) more easily in the event of a need to substitute the antenna assembly 400. While releasable fasteners may be employed, use of an excavator bucket for its intended purposes often means that fasteners may be bent or damaged, meaning that the most efficient method of removing the fasteners may be by grinding them away.

Each fastener may comprise a bolt and a nut. The bolt may comprise a head that is flush with the surface of the base 510. The nut may sit inside the excavator bucket 500 and protrude above an interior surface of the bucket cavity 540.

While not shown in the embodiment of FIG. 11, the location of the fixing holes may be selected to maintain the rotationally symmetrical nature of the dual antenna assembly 400.

As such, the orientation of the dual assembly 400 may be such that the transmitter 470 transmits preferentially in a direction towards the blade 520 and the receiver 480 receives preferentially from a direction facing the blade 520. Alternatively, by releasing the fixings and rotating the dual antenna assembly 400 by 90 degrees, the same fixings and fixing holes may be used to attach the antenna assembly 400 such that the transmitter 470 preferentially transmits in a direction transverse to the blade 520 and the receiver 480 preferentially receives in a direction transverse to the blade 520.

As discussed above, the signals are sent via coaxial cables between the dual antenna assembly 400 and the radar control module which is located within the top cavity of the excavator bucket 500. Separating the radar control module from the dual antenna assembly 400 means that only those components whose location relative to the cutting blade is significant are located in that manner. By contrast, those elements whose location relative to the excavator blade 520 is not significant, for example those of the radar control module, are located at a distance from the excavator blade 520. This means that they may be less vulnerable to damage from impact of the excavator blade 520 and the rest of the base 510 of the excavator bucket 500 impacting the ground or other materials to be excavated.

While the embodiment illustrated in FIG. 11 relates to an excavator bucket 500, it should be noted that the claimed antenna and the broader radar system is applicable to a much wider range of potential applications. For example, other applications would include other machine work tools such as drilling tools, augers, flails and mulchers.

Looking outside the field of machines with work tools, other applications would include airborne vehicles, including autonomous aircraft such as drones. These embodiments may be particularly useful for applications where the aim of a subterranean profile is sought, perhaps in anticipation of construction work.

Regardless of the application, the radar system may involve the obtaining of geo-location data to be matched with the radar system output information in order to build a subterranean map of the area that is subject to the radar system analysis.

The radar system of the present disclosure is particularly appropriate for low-cost applications, such as in machine work tools, where a whole range of tools may require the system and where the environment of the tool is such that component replacement may be more frequent that in other radar applications. Furthermore, the radar system of the disclosure is a low power solution by comparison with many prior art radar systems and, accordingly, it is appropriate for applications where low power is a particular benefit, such as in the context of small scale autonomous aircraft having small battery packs and where there is a desire for the radar system to have minimal impact on flying range.

The radar system of the present disclosure is not limited to ground-penetration applications though it is particularly suitable for applications where the antenna position relative to the ground is likely to move between proximate (where ground coupling is necessary) and distant (where air coupling is necessary).

Further aspects of the disclosure are set out in the following numbered clauses:

1. An antenna for a ground-penetration radar system, the antenna comprising:
   a housing defining a cavity having an opening, the cavity containing:
   a radiator on a first surface of a planar substrate, the radiator comprising a planar, bow-tie-based shape layer on or adjacent the first surface of the substrate, the radiator being connected to a transmission line balun formed on said planar substrate;
   a wear-block located between the radiator and the opening to the cavity for providing mechanical protection to the radiator; and
   an absorber assembly located on an opposite side of the radiator from the opening, the absorber assembly comprising a microwave absorber and a first dielectric layer, wherein the first dielectric layer is located between the radiator and the microwave absorber.
2. The antenna of clause 1 wherein the microwave absorber has a permeability that causes power loss of at least 60%, or at least 70% or at least 80% or at least 90% at frequencies above 1 GHz.
3. The antenna of clause 1 wherein the microwave absorber comprises metal flakes distributed in a polymer resin.
4. The antenna of clause 1 further comprising a resistive underlay located between the planar substrate and the first dielectric layer.
5. The antenna of clause 4 wherein the resistive underlay comprises graphite.

6. The antenna of clause 1 wherein the absorber assembly comprises a second dielectric layer, wherein the microwave absorber is located between the first dielectric layer and the second dielectric layer.
7. The antenna of clause 6 wherein the absorber assembly comprises N supplementary dielectric layers and N−1 supplementary microwave absorber layers, wherein the supplementary microwave absorber layers and the supplementary dielectric layers alternate.
8. The antenna of clause 1 wherein the substrate comprises a printed circuit board substrate and wherein the radiator is printed on the printed circuit board substrate in an antipodal arrangement.
9. The antenna of clause 8 and wherein said transmission line balun is printed on the printed circuit board substrate.
10. The antenna of clause 1 wherein the substrate has a thickness of less than 1 mm, preferably less than 0.5 mm, more preferably 0.25 mm.
11. The antenna of clause 4 wherein at least a portion of the underlay has a resistivity of between 400 and 600 Ohms/square.
12. The antenna of clause 6 wherein one or more of: the wear-block; the first dielectric layer; and the second dielectric layer has a dielectric constant of between 1.0 and 4.0, preferably 2.7.
13. The antenna of clause 6 wherein one or more of: the wear-block; the first dielectric layer; and the second dielectric layer comprises or consists of plastic with a value of at least 60 on a Shore D durometer scale.
14. The antenna of clause 13 formed by pouring a liquid version of said plastic into a mould having at least the radiator held therein.
15. The antenna of clause 4 wherein:
a sum of volumes of the following components: the wear-block; the planar substrate; the radiator; the underlay; and the absorber assembly is at least 99% of a volume of the cavity,
such that the cavity is at least 99% occupied without air gaps.
16. The antenna of clause 1 and also comprising resistive loading.
17. A dual antenna assembly comprising a matching pair of antennas, wherein each of the matching pair of antennas is in accordance with clause 1.
18. The dual antenna assembly of clause 17 comprising a compound housing wherein the compound housing comprises the housing of the first of the pair of antennas and the housing of the second of the pair of antennas.
19. The dual antenna assembly of clause 18 wherein the compound housing is rotationally symmetrical such that it can be mounted either with the pair of antennas left and right or with the pair of antennas top and bottom.
20. An excavator bucket comprising the dual antenna assembly of clause 17.
21. An antenna for a radar system, the antenna comprising:
a housing defining a cavity having an opening, the cavity containing:
a radiator on a first surface of a planar substrate, the radiator comprising a planar, conducting layer having a bow-tie-based shape on or adjacent to the first surface of the substrate, the radiator being connected to a transmission line balun formed on said planar substrate;
a wear-block located between the radiator and the opening to the cavity for providing mechanical protection to the radiator; and
an absorber assembly located on an opposite side of the radiator from the opening, the absorber assembly comprising a microwave absorber and a first dielectric layer, wherein the first dielectric layer is located between the radiator and the microwave absorber.

INDUSTRIAL APPLICABILITY

The antennas of the present disclosure are applicable to a wide variety of industrial applications such as those referenced above. In particular, the antennas of the disclosure may be appropriate for ground-penetration radar applications. For example, the antennas may be applicable to radar systems for use with machine work tools such that feedback may be provided to an operator in real time which allows immediate feedback prior to cutting into the ground. This enables subterranean features to be found and/or avoided as appropriate. In another example, the radar system may be appropriate for surveying applications. Surveying applications may involve mounting the radar system in an airborne vehicle or in a ground vehicle designed to complete a survey of a site perhaps by making a systematic pass (e.g., in rows or columns) across the site to be surveyed.

The invention claimed is:

1. An antenna for a ground-penetration radar system, the antenna comprising:
a metal or metal-coated housing having a cavity therein;
a multiplicity of polymer plastic dielectrics filling said cavity; and
a planar printed radiating element connected to a balun recessed within at least one of said polymer plastic dielectrics,
wherein said housing has an opening which permits emission of radiation to and from the radiating element,
wherein at least one of said polymer plastic dielectrics is loaded or layered with microwave absorbing material,
wherein at least one of said polymer plastic dielectrics provides mechanical protection to said radiator; and
wherein at least one of said polymer plastic dielectrics has a dielectric constant between the dielectric constant of ground and the dielectric constant of air.
2. The antenna of claim 1 wherein said radiating element has a dipole with radiating arms.
3. The antenna according to claim 2 wherein said dipole is derived from a truncated bi-cone projected onto a plane.
4. The antenna according to claim 3 wherein said metal housing is formed by sheet metal, by a process of metallization or by a metal coating technique.
5. The antenna according to claim 2 wherein said dipole arms are at least partially elliptical or circular.
6. The antenna according to claim 2 wherein said microwave absorbing material is an electrically or magnetically active material.
7. The antenna according to claim 6 wherein said electrically or magnetically active material comprises at least one of: metal flakes and graphite.
8. An excavator bucket comprising the antenna of claim 1.

* * * * *